SEALED CONTACT DEVICE WITH FERRITE ELEMENTS

Original Filed Dec. 27, 1961

*Inventor*

B. Dal Bianco
M. Scata

By [signature]
Attorney

United States Patent Office 3,233,062
Patented Feb. 1, 1966

3,233,062

SEALED CONTACT DEVICE WITH FERRITE ELEMENTS

Bruno Dal Bianco, Milan, and Mario Scata, Monza, Milan, Italy, assignors to International Standard Electric Corporation, New York, N.Y., a corporation of Delaware Continuation of application Ser. No. 162,485, Dec. 27, 1961. This application Nov. 16, 1964, Ser. No. 412,879
7 Claims. (Cl. 200—87)

This is a continuation of application Serial No. 162,485, filed December 27, 1961, now abandoned.

The present invention relates to sealed contact devices using ferrite elements as a magnetic bias for the reed armature. An example of the sealed contact device used in this invention may be similar to that disclosed in U.S. Patent No. 3,056,869, issued October 2, 1962.

One of the features of the present invention is to use small ferrite elements to control the make-and-break operations of the contacts enclosed and sealed into glass vessels, as described in the above-mentioned patent.

A principal object of the present invention is then to extend the utilization possibilities of the sealed contact units by using such ferrite elements.

An object of the present invention is to operate and temporarily hold the electrical contact of a sealed contact device closed, by sending a pulse of polarized current and to release said contact by sending another pulse oppositely polarized. This is made possible because the effect of a ferrite magnet placed in a suitable position between the magnetic members of a sealed contact relay, is such that it holds the contact operated after having sent a current pulse, its effect being to increase the permanent magnetisation of the ferrite element and to release said contact by means of a pulse of opposite current.

Another object of the present invention is to provide a bistable device (flip-flop) by using two sealed contact units in conjunction with a ferrite element and keying polarized current pulses.

A further object of the present invention is also to make it possible to use one or more sealed contact devices in conjunction with ferrite elements, having a rectangular hysteresis loop and carrying an actuating winding to accomplish various effects.

Using the arrangements comprising the objects above mentioned it is possible to obtain a plurality of different applications to be used in the communication field, in the fields of memory circuits, computing machines, change-over switches, standard switches, selectors, etc.

The above features and objects of the present invention and the manner of attaining them will become more apparent and the invention itself will be better understood by reference to the following description of three embodiments of the invention taken in conjunction with the accompanying drawings, wherein.

Figures 1, 2, 3:
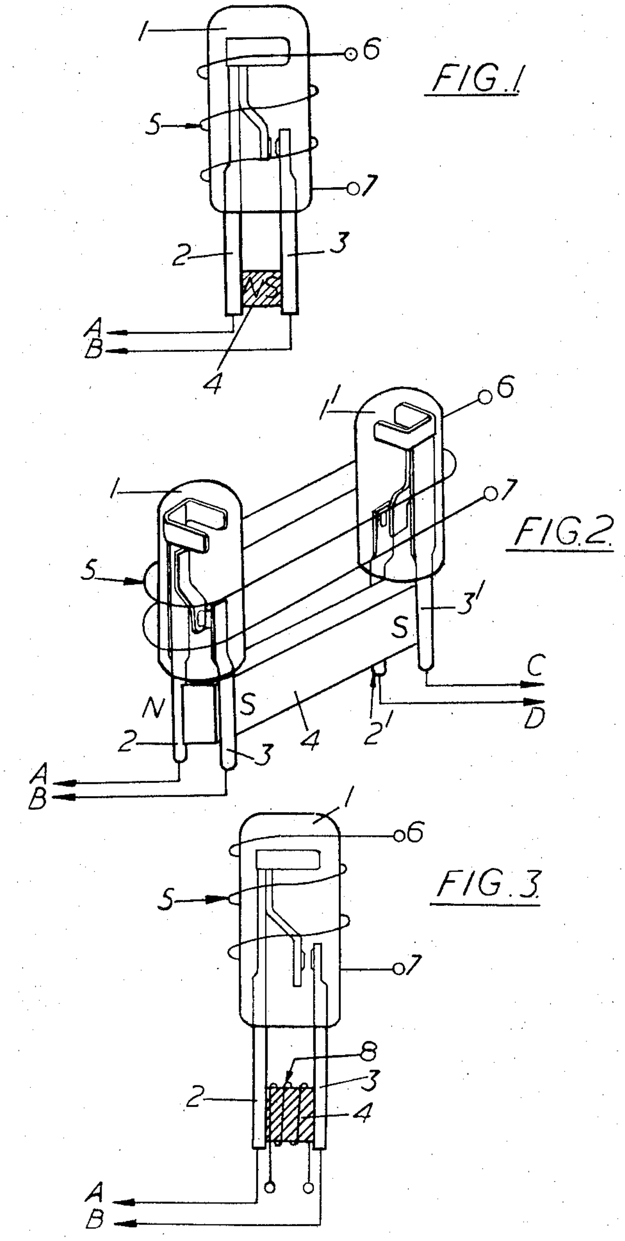
FIG. 1 shows schematically a sealed contact relay carrying a permanent magnetisation bar or a small block of ferrite placed between the magnetic terminals protruding from the vessel.
FIG. 2 illustrates schematically a couple of sealed contact devices, composing a relay, coupled therebetween by a permanent magnetisation ferrite bar, placed between the magnetic terminals protruding from the two vessels.
FIG. 3 illustrates schematically a sealed contact relay, the terminals of which comprise a permanent magnetisation ferrite bar having a rectangular hysteresis loop and carrying an actuating winding.

Referring now to FIG. 1, there is illustrated a vessel 1 containing the magnetic members carrying electric contacts, as claimed in our above-mentioned patent application, between two terminals 2–3 of which is introduced a small block or bar 4 of ferrite having permanent magnetisation. As is known, ferrite is a ferromagnetic material having insulating electrical properties and therefore it can be placed in contact with the two terminals 2–3 of vessel 1 without modifying the electrical circuit thereof and not causing losses in the magnetic circuit thereof. To said terminals 2–3 there is also connected the external circuit AB, in the known manner. By 5 there is indicated the electric winding for the actuation of the relay contacts. The winding is disposed so as to produce a magnetic field directed at a right angle with the lines of the magnetic circuit of the ferrite. When a pulse of polarized current circulates through winding 5 the contact closes, if it was open or opens, if it was closed depending upon the direction of the energizing current flowing through the winding from terminals 6 and 7. This is due to the fact that, in the case of the make-contact after the combined action of the ferrite magnet and the pulse of polarized current, the energy of said ferrite magnet is sufficient to hold said contact closed.

It is obvious that this arrangement will make it possible to employ these relays carrying ferrite blocks in several applications such as circuit breakers, memories, push buttons, selectors, etc.

FIG. 2 illustrates the use of a couple of vessels 1–1′ containing magnetic members carrying electrical contacts, between the external terminals of which 2–3, 2′–3′ there is introduced a small ferrite bar 4 having permanent magnetisation, in the manner shown in the figure. An electrical winding 5 surrounds the two vessels 1–1′ and as soon as current flows through the former a magnetic field is started, the direction of which is at right angle with that of the magnetic lines inherent to the bar or magnet 4 of ferrite. When said two magnetic sealed contact devices 1–1′ are alternately arranged, riding on the ends of ferrite bar, having permanent magnetisation, the arrival of a pulse of polarized current flowing in coil 5 in one direction, causes the electrical contact of vessel 1 to operate if that of vessel 1′ was open and vice-versa. The utilization circuits are connected to conductors AB and CD, as it is known. It is evident that by a suitable connection in common to said two terminals it will also be possible to obtain a switchover contact.

The device illustrated in FIG. 2 can then be used in several applications such as: polarized relays, memory circuits, flip-flop circuits, line concentrators, selectors, etc.

FIG. 3 illustrates a sealed contact device 1 between the magnetic terminals 2 and 3 of which there is introduced a ferrite block 4 carrying a winding 8. This ferrite block is known, in the art of magnetic materials, to have a predetermined rectangular hysteresis loop characteristic due to which its magnetisation conditions can be changed by using pulses of electrical current. For example, it is known that each succeeding pulse of electrical current can be used to drive the ferrite block to a successively greater degree of magnetisation, until the ferrite becomes magnetically saturated. Therefore, winding 8 may be used, in response to pulses, to cause variations from previously existing conditions in the magnetic condition of the material.

By combining the action of winding 5 with the action of winding 8, these being set at an angle of 90° with each other and using pulses of electrical current properly directioned, there will be obtained various and interesting effects for the actuation of electrical circuits. For example, a particular current applied to winding 5 may be applied so that one, two, three or more pulses must be applied to winding 8 before the magnetic field induced in ferrite block 4 will be adequate to close the contacts. In this way, the switch in FIG. 3 may be considered to operate as a counter.

From the above there follows that the arrangements in question are given as preferred illustrative examples of the application of the principle of the present invention. Several other arrangements can be devised by those skilled in the art without departing however from the spirit and the scope of the present invention.

What is claimed is:

1. A magnetically operated switch structure comprising:
   a switching unit having first and second spaced parallel bars of magnetic material and a cooperating armature of magnetic material positioned in flux-linking relationship therewith;
   an enclosing envelope within which said armature and a portion of said bars are enclosed with the other portion of said bars extending externally out of one end of said envelope and sealed therethrough in a vacuum-tight manner;
   magnetic core means positioned between the external portions of said bars;
   a winding on said core for establishing a first magnetic field varying in strength in proportion to the number of individual signal pulses received and traversing a closed magnetic path to said armature; and
   a flux generating winding encirclng said envelope and external to said closed path for selectively generating a second magnetic field reinforcing or opposing said first magnetic field.

2. A magnetically operated switch structure as set forth in claim 1 wherein:
   said magnetic core means comprises magnetically permeable material having rectangular hysteresis loop characteristics.

3. A magnetically operated switch structure as set forth in claim 1 wherein:
   said magnetic flux generating means is electrically insulated from and magnetically linked with said parallel bars.

4. The switch of claim 1 wherein:
   said magnetic core comprises a ferrite block and said winding on said core comprises means for incrementally driving said core to magnetic saturation responsive to successive pulses of electrical current.

5. An electro-magnetic counter, comprising:
   switch means coupled to terminals for connection to external circuits;
   magnetic core means positioned to provide a first magnetic field to influence said switch means;
   a first winding;
   said first winding embracing said magnetic core to progressively increase the magnetization of said core in steps according to the number of pulses of electromagnetic energy received by said first winding;
   a second winding;
   said second winding embracing said switching means to provide a second magnetic field to be combined vectorially with said first magnetic field;
   said first and second magnetic fields combining to operate said switch means when the magnetization of said first winding reaches a prescribed level in coincidence with the magnetization of the second winding and to control current to said external circuits in accordance with predetermined relationships.

6. An electromagnetic counter, comprising:
   a pair of armature arms composed of magnetic material;
   contact means for completing an electric circuit, each of said contact means being fastened to one of said armature arms;
   a winding encircling first ends of said armature arms for supplying a first magnetic field to influence the closure of said contact means;
   core means positioned to complete a magnetic circuit between second ends of said armature arms;
   a winding on said core means for supplying a second magnetic field to influence the closure of said contact means; and
   said core means responding to successive pulses of electrical energy in said winding to be driven in discrete steps toward electromagnetic saturation.

7. An electro-magnetic counter, comprising:
   switching means having first and second spaced bars of magnetic material bearing contact means;
   a magnetic core positioned to form magnetic linkages with first ends of said bars;
   a winding on said magnetic core means for magnetizing said core in response to a plurality of pulses to establish a first magnetic field;
   said magnetic core means response to successive pulses of electromagnetic energy to be driven to successively higher states of magnetization;
   a flux generating winding positioned to form magnetic linkages with second ends of the bars and in response to electromagnetic signals to provide a second magnetic field reinforcing or opposing said first magnetic field to provide resultant magnetic field; and
   the resulting magnetic field serving to operate said switching unit when a pre-determined number of electromagnetic pulses have been received by said magnetic core means.

References Cited by the Examiner

UNITED STATES PATENTS

| | | | |
|---|---|---|---|
| 2,892,051 | 6/1959 | Moore | 200—81 |
| 2,907,846 | 10/1959 | Wilhelm | 200—87 |
| 2,965,733 | 12/1960 | Ter Borg et al. | 200—87 |
| 2,992,306 | 7/1961 | Feiner | 200—87 |
| 2,995,637 | 8/1961 | Feiner et al. | 200—87 |
| 3,002,067 | 9/1961 | Baldwin et al. | 200—87 |
| 3,005,072 | 10/1961 | Brown | 200—87 |
| 3,008,020 | 11/1961 | Mason | 200—87 |

BERNARD A. GILHEANY, *Primary Examiner.*